Jan. 26, 1971  C. C. CHRISTIANSON  3,558,361
SYSTEM AND PROCESS FOR SELECTIVELY DIVERTING
AN ELECTROCHEMICALLY CONSUMABLE
AND REGENERABLE FLUID
Filed Dec. 1, 1967  4 Sheets-Sheet 1

INVENTOR:
CLINTON C. CHRISTIANSON,
BY Carl O. Thomas
HIS ATTORNEY.

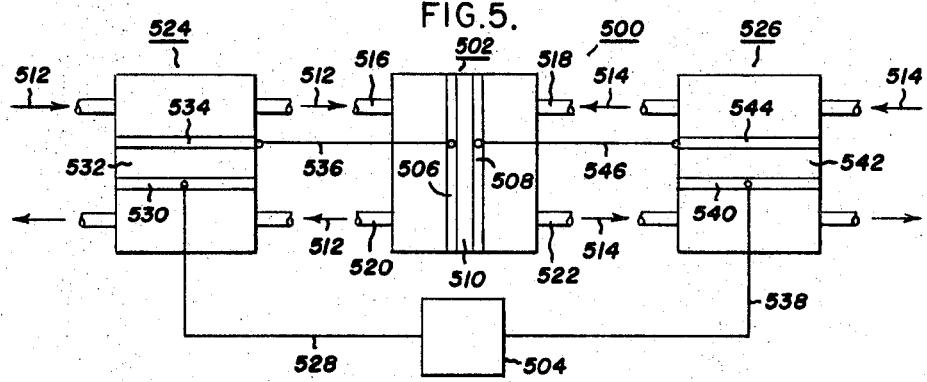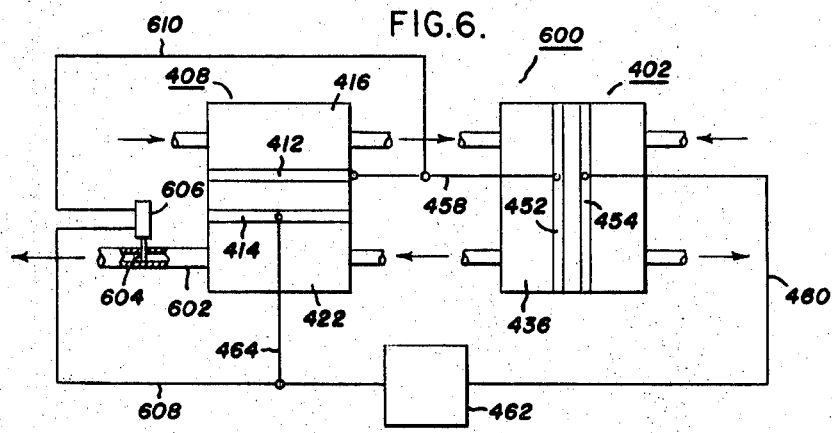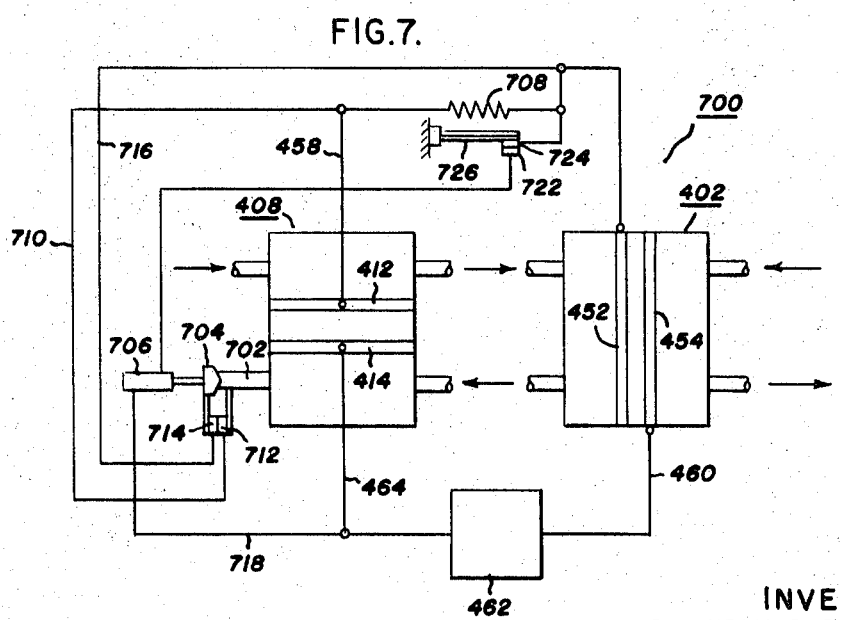

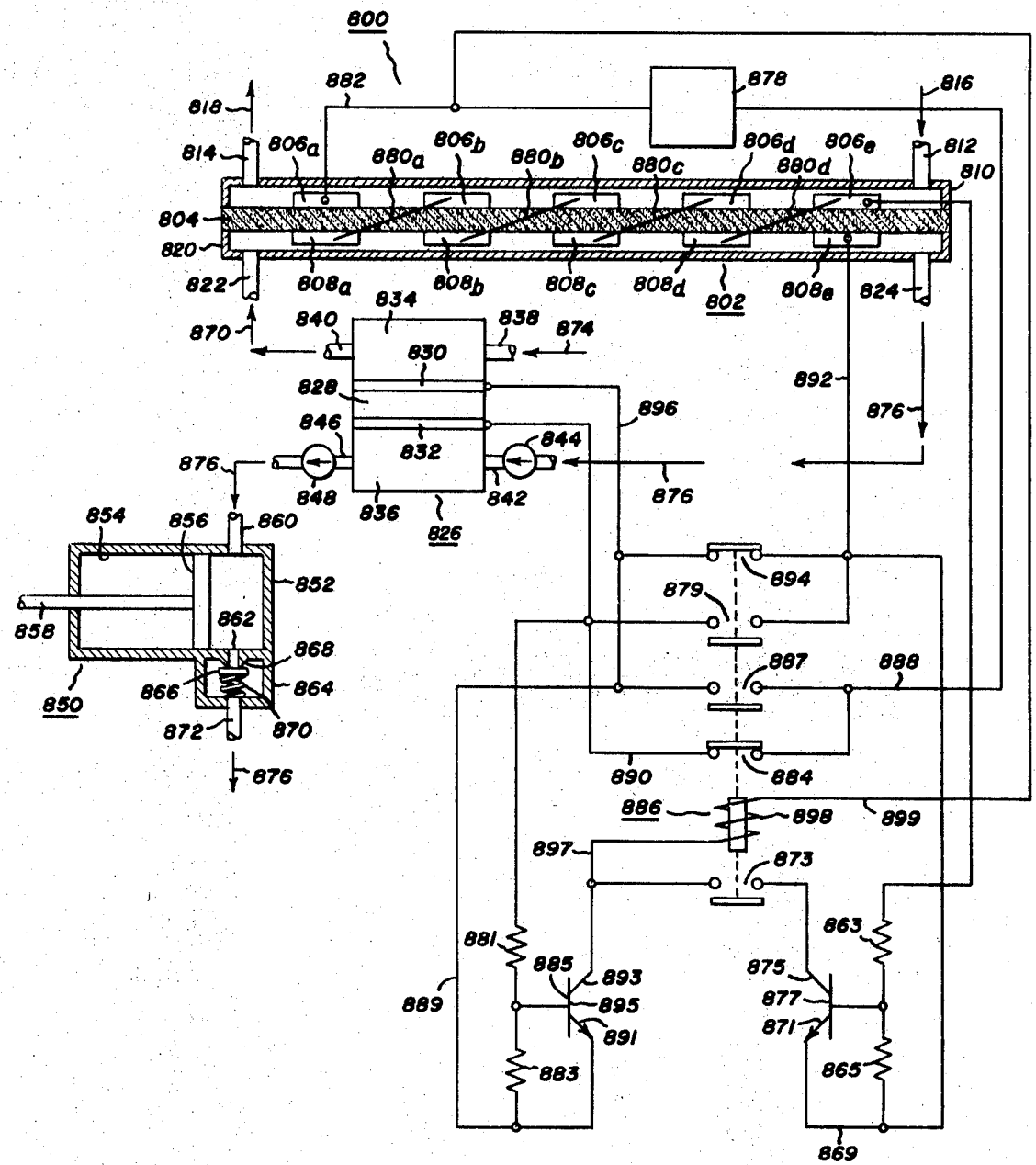

United States Patent Office 3,558,361
Patented Jan. 26, 1971

3,558,361
SYSTEM AND PROCESS FOR SELECTIVELY
DIVERTING AN ELECTROCHEMICALLY
CONSUMABLE AND REGENERABLE FLUID
Clinton C. Christianson, Danvers, Mass., assignor to General Electric Company, a corporation of New York
Filed Dec. 1, 1967, Ser. No. 687,327
Int. Cl. H01m 27/14
U.S. Cl. 136—86
33 Claims

ABSTRACT OF THE DISCLOSURE

A fluid stream is pumped to and from a receiving zone. A cell bridges the fluid stream upstream and downstream of the receiving zone and has one electrode in contact with the fluid stream upstream of the receiving zone and a second electrode in contact with the fluid stream downstream of the receiving zone. The electrodes are ionically communicated by an electrolyte.

---

The receiving zone may either heat or cool the fluid stream. An electrochemically consumable and regenerable fluid contained in the fluid stream may be displaced from one electrode to another in contact with the fluid stream and thereby diverted. In one case an electrical current may be sustained through an electrical load connected across the electrodes. In another case an electrical potential may be impressed across the electrodes to facilitate electrochemical consumption and regeneration of the fluid to be displaced.

In another form the receiving zone may be a chemical reaction zone. The fluid electrochemically consumable and regenerable at the electrodes may be either diverted from or recirculated through the reaction zone, depending upon the choice of polarity of an electrical potential across the electrodes.

In still another form the receiving zone may contain a selectively permeable barrier for physically separating one fluid from the fluid stream. Displacement between the electrodes may be utilized to alter the concentration of the fluid to be physically separated adjacent one face of the barrier.

In a preferred form the receiving zone may be the reactant chamber of a fuel cell unit. Displacement between the electrodes may in this instance be utilized to retrieve an electrochemically reactive fluid from the purge fluid leaving the reactant chamber. In another form an electrode poisoning species may be diverted from the fuel cell upstream by displacement between the electrodes. In an additional form the direction of displacement between the fluid streams entering and leaving the reaction chamber may be reversed periodically upon sensing a predetermined potential across the electrodes. Polarity reversal may continue for a fixed period of time, for a fixed volume of fluid, or until the fuel cell unit exhibits a predetermined degree of polarization. In one form polarity reversal of the electrodes is initiated by the polarization of the electrodes actuating a relay. Where the fuel cell unit is the power source of displacement, this reverses the polarity of interconnection between the fuel cell unit and the pumping electrodes and reverses the direction of pumping. To start up the system which incorporates the fuel cell unit, a hand pump is used initially to purge the fuel cell unit and draw the fluid stream into contact with the electrodes. Alternatively, where the electrolyte of the fuel cell unit contains some water, initial purging may be accomplished by connecting the fuel cell unit to a D.C. power source to generate hydrogen and oxygen for purging by electrolysis.

When the fuel cell unit is a fuel battery, it is preferably formed of an electrolyte element that forms a part of the fluid confining structure making up the reaction chamber and may be provided with a plurality of electrodes mounted on the electrolyte element within the reaction chamber and with a plurality of counter electrodes mounted on an opposite surface of the electrolyte element. The electrodes are connected electrically in series to provide a high voltage output fuel battery.

SUMMARY OF THE INVENTION

My invention in one aspect is directed to a process for diverting from and returning to a fluid stream comprised of a plurality of fluids a selected fluid which is electrochemically consumable and regenerable. At least a portion of the fluid stream is circulated through a receiving zone. The electrochemically consumable and regenerable fluid is displaced between a segment of the fluid stream located upstream of the receiving zone and a segment of the fluid stream located downstream of the receiving zone. The fluid is consumed at one electrode located in contact with one fluid stream segment. The consuming electrode is electrolytically communicated with a second electrode in contact with the remaining fluid stream segment at which the fluid is electrochemically regenerated.

The step of heating or cooling the fluid stream may be performed in the receiving zone. Additionally or alternatively, at least a portion of the fluid stream may be removed in the receiving zone. This may be accomplished by chemical or electrochemical reaction in the receiving zone. Also, at least a portion of the fluid making up the fluid stream may be physically separated from the fluid stream within the receiving zone. In any case the consumable and regenerable fluid may be displaced from thhe upstream to the downstream segment or vice versa.

In a preferred application the consumable and regenerable fluid is partially electrochemically consumed in the receiving zone, which may be the reaction chamber of a fuel cell. The consumable fluid remaining in the downstream segment of the fluid stream is normally displaced between the electrodes to the upstream segment. When a predetermined polarization develops across the electrodes, the direction of displacement may be reversed. Displacement in the reversed direction may continue for a fixed period of time, through a fixed volume of fluid, or until polarization of the fuel cell electrode within the reaction chamber occurs.

In another aspect my invention is directed to a system in which there may be circulated a fluid stream comprised of a plurality of fluids at least one of which is electrochemically convertible to an ionized form and electrochemically consumable and regenerable. A fluid receiving means is provided as well as means for transporting at least a portion of the fluid stream to and from the fluid receiving means including a fuel cell unit. The fuel cell unit is comprised of first and second electrode means capable of electrochemically consuming and regenerating the one fluid. The first and second electrode means lie in fluid communication with the fluid stream upstream and downstream, respectively, of the receiving means. Electrolyte means ionically communicating the first and second electrode means is capable of providing ion transport between the electrode means. Means are provided for electronically conductively connecting the first and second electrode means to promote ion transport between the electrode means.

The receiving means may be a means permitting heating or cooling of at least a portion of the fluid stream. In one form a cell unit may be the heating means. In another form the receiving means may be comprised of a means for physically separating a portion of the fluid stream, such as a hydrogen permeable, non-porous metal element or a selectively permeable membrane.

In a preferred form the receiving means is the reaction chamber of a second cell unit having at least one electrode within the reaction chamber in communication with the fluid stream. The second cell unit is preferably connected electrically in series with the first or fuel cell unit so that the fluid is displaced across the first cell unit thereby. Normally the fluid is displaced from the fluid stream downstream of the second cell unit to the fluid stream upstream of the second cell unit. Means may be provided to periodically reverse the polarity of interconnection between the cell units to displace the fluid in the opposite direction across the first cell unit. The reversing means may include means to maintain polarity reversal for a predetermined time interval, until a predetermined volume of fluid is displaced, or until the second cell unit becomes polarized. The second cell unit is preferably a fuel cell or battery.

DESCRIPTION OF THE DRAWINGS

FIG. 5 is a partially schematic diagram of a modfiication of the system shown in FIG. 4;

FIG. 6 is a partially schematic diagram, with a valve unit shown in section, of a modification of the system shown in FIG. 4;

FIG. 7 is a partially schematic diagram of another modification of the system shown in FIG. 4;

FIG. 8 is a partially schematic diagram, with a fuel battery shown in section, of a preferred system according to my invention.

DETAILED DESCRIPTION

As used herein the term "cell unit" is intended to be generic to units comprised of either a single cell or a battery of cells. The term "fuel cell" is for convenience in describing the invention here defined as a cell having electrodes and electrolyte which remain substantially chemically invariant in use. Such cells have electrodes that catalyze electrochemical reactions converting fluids to ions and/or ions to fluids without the electrodes or the electrolyte being consumed in use. Cells of this type are most frequently used to generate electricity when an electrochemically oxidizable fluid is supplied to one electrode and an electrochemically reducible fluid is supplied to a counter electrode. In what may be structurally identical forms such cells may also generate electricity when an electrochemically consumable and regenerable fluid is supplied to one electrode in greater concentration (or pressure) or at a higher temperature than at the counter electrode. Also, such cells, in what may be structurally identical forms, may be used to displace an electrochemically consumable and regenerable fluid across the electrodes when a potential difference is impressed across the electrodes. While fuel cells used in each of these applications share the common characteristic of substantial invariancy of electrode and electrolyte composition in use, it is recognized that some structural divergency may be introduced to better adapt the cells to a particular pressure, moisture, or thermal balance encountered in a specific application. Nevertheless, it is apparent that I use the term "fuel cell" to designate a closely related class of cell structures rather than merely to indicate a particular use to which one or more of such cells may be applied.

As used herein the term "electrochemically consumable and regenerable fluid" refers to a fluid that can be either oxidized or reduced by conversion to an ionized form or reaction with an ion and subsequently regenerated in its original form at a fuel cell electrode by reduction or oxidation, respectively. Hydrogen is exemplary of a fluid that is electrochemically oxidizable to yield protons or hydrogen ions. The protons can be readily electrochemically reduced to regenerate the hydrogen gas. For purposes of comparison it is noted that methane is electrochemically oxidizable at the anode of a fuel cell. Methane so consumed, however, cannot be regenerated electrochemically in its original form at the counter electrode of a fuel cell. To illustrate an oxidant, oxygen or halogen may be readily reduced at a fuel cell cathode and may be readily regenerated in the original form by electrochemical oxidation at the counter electrode of the fuel cell. By contrast, peroxides, which are readily reduced at a fuel cell cathode cannot be regenerated at the counter electrode.

Figure 1:
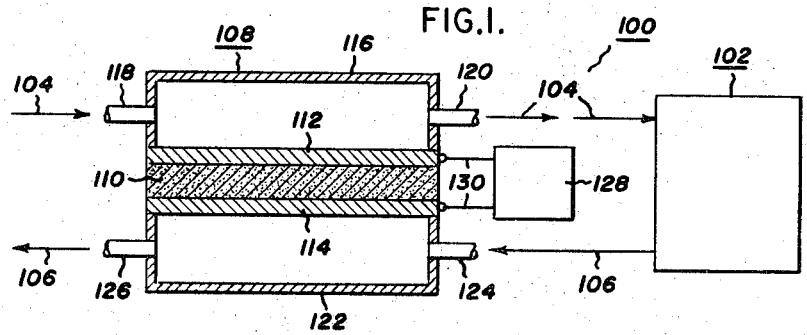
FIG. 1 is a partially schematic diagram, with the fuel cell unit shown in section, of a system constructed according to my invention.

FIG. 1 illustrates a system 100 comprised of a fluid receiving means 102, schematically illustrated. A fluid stream is illustrated being delivered to the receiving means by flow arrows 104 and being circulated from the receiving means by flow arrows 106. The flow arrows 104 schematically illustrate the segment of the fluid stream supplied to the receiving means and lying upstream of the receiving means while the flow arrows 106 schematically illustrate the segment of the fluid stream downstream of the receiving means. The fluid stream is preferably carried in conduits, not shown. These conduits and the fuel cell unit 108 together comprise a means for transporting the fluid stream to and from the receiving means.

For simplicity the fuel cell unit 108 is schematically illustrated as being comprised of an electrolyte element or means 110 having spaced electrodes 112 and 114 mounted in contact therewith. A housing portion 116 is mounted adjacent the electrode 112 and is provided with an inlet conduit 118 and an outlet conduit 120 allowing the upstream fluid segment to pass therethrough. In like manner a housing portion 122 is mounted adjacent the electrode 114 and is provided with an inlet conduit 124 and an outlet conduit 126 allowing the downstream fluid segment to pass therethrough. Electrical leads 130 extend between the electrodes and electronically conductive means 128, schematically shown, which completes the electron flow path between the electrodes.

To illustrate a specific application of the system 100 in which electrical energy is generated, the receiving means 102 may constitute a means which cools or permits cooling of the fluid stream. In this arrangement the fluid steam segment upstream of the receiving means as represented by flow arrows 104 will initially lie at a temperature above the fluid stream segment downstream of the receiving means as represented by flow arrow 106. A tempeature differential will then exist across the electrodes 112 and 114 of the fuel cell unit 108.

If it is assumed for purposes of illustration that the fluid stream initially contains gaseous iodine in an inert carrier gas, such as nitrogen, the electrolyte element 110 is comprised of silver iodide, and the electrode 112 and 114 are porous electrodes capable of oxidizing and reducing iodine, hot gaseous iodine contained in the fluid stream upstream of the receiving means will be reduced to iodide ions on the electrode 112 and the iodide ions transported through the electrolyte element. At the electrode 114 the iodide ions are oxidized to regenerate the iodine gas. The electrons liberated in the oxidation of the iodide ions to gaseous iodine are consumed in the reduction of the iodine gas at the counter electrode. Accordingly electrons are transported between the electrodes through electrical leads 130 and conductive means 128, which in this instance may be an electrical load. Not only is electricity generated but iodine gas is diverted from the receiving means.

In contemplating the alternate situation in which the receiving means 102 is a means which heats or permits heating of the fluid stream, it can be appreciated that the direction of iodine displacement across the electrodes of the fuel cell unit will be reversed as well as the direction of the electrical current through the means 128, which is still an electrical load. In this situation, rather than diverting iodine from the receiving means 102 the fluid stream being supplied to the receiving means is being constantly enriched by iodine displaced across the electrodes. In addition to producing useful amounts of electricity it can be seen that the system 100 can also be used to scrub iodine from the fluid stream leaving the outlet conduit 126 of the housing portion 122.

In a varied form of the system 100 the receiving means may be the site of a chemical reaction. Where the receiving means cools the fluid stream, an endothermic reaction may be occurring which produces the temperature differential between the incoming and outgoing segments of the fluid stream. In this case the diversion of iodine from the receiving means may optionally serve the additional useful purpose of preventing iodine from reaching the receiving means. Similarly, it can be appreciated that where the receiving means heats the fluid stream, an exothermic chemical reaction may be taking place within the receiving means. In this situation it can be readily appreciated that my invention has significant utility in improving the efficiency with which ionizable and regenerable fluid may be exothermally consumed in the receiving means.

Where it is not desired that the fuel cell unit 108 generate electricity, but rather the fuel cell unit is provided for its ability to divert an electroohemically consumable and regenerable fluid, the electronically conductive means 128 may be a D-C potential source. In this case when the receiving means 102 is the site of an endothermic or exothermic chemical reaction as described above, the ionizable and regenerable fluid may be displaced by the fuel cell unit so as to achieve diversion from or back to the reaction site. In this instance the direction of displacement across the electrodes 112 and 114 is not determined by the temperature differential, but is controlled by the polarity of the D-C potential impressed across the electrodes. It is further apparent that where a D-C potential is being impressed across the electrodes, the system 100 may be utilized for the diversion of the pumpable fluid regardless of whether any significant temperature differential exists across the fluid stream segments entering and leaving the receiving means; i.e., where the receiving means is a chemical reaction site my invention may be practiced with exothermic, endothermic, or iso-thermal chemical reactions occurring within the receiving means. It is additionally recognized that a D-C potential source may be utilized to displace the consumable and regenerable fluid across electrodes of differing temperatures in a direction opposite to the direction in which the fluid would be spontaneously displaced if the electrodes were electronically connected through an electrical load. In a situation where a D-C potential is applied to the fuel cell unit 108 it is then apparent that the consumable and regenerable fluid can be diverted from or back to the reaction site independently of any spontaneous driving force tending to pump the fluid. It is, of course, appreciated that a thermal gradient across the electrodes of the fuel cell unit is only one of a number of types of spontaneous driving forces. Differences in the partial pressures of a consumable and regenerable fluid in contact with opposed electrodes of a fuel cell unit may give rise to a spontaneous driving force as well as differences in the concentration of displaceable fluid in contact with the opposed electrodes of a fuel cell unit.

One very useful application for the system 100 is that it may be used to meter out a measured amount of consumable and regenerable fluid to the downstream segment of the fluid stream. For example, if it is assumed that the receiving means is the site of a chemical reaction which completely removes the consumable and regenerable fluid from the entering fluid stream, the fluid stream leaving the receiving means will be completely devoid of the consumable and regenerable fluid. If a given amount of the consumable and regenerable fluid is desired in the fluid stream as it leaves the system, this may be accomplished by connecting a D-C potential across the electrodes of the fuel cell unit 108. By controlling the number of coulombs passing through the external electronic conduction path, the transport of ions through the electrolyte may be in turn controlled, and the desired proportion of consumable and regenerable fluid may be provided in the fluid stream leaving the system.

Figure 2:
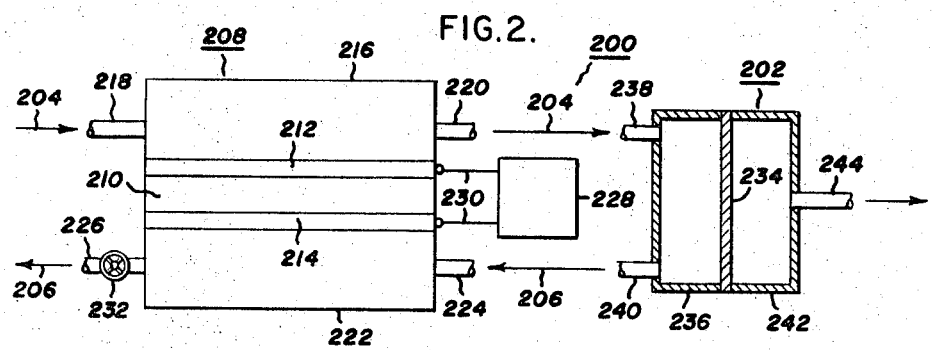
FIG. 2 is a partially schematic diagram, with the receiving means in section, of a modified system.
Figure 3:
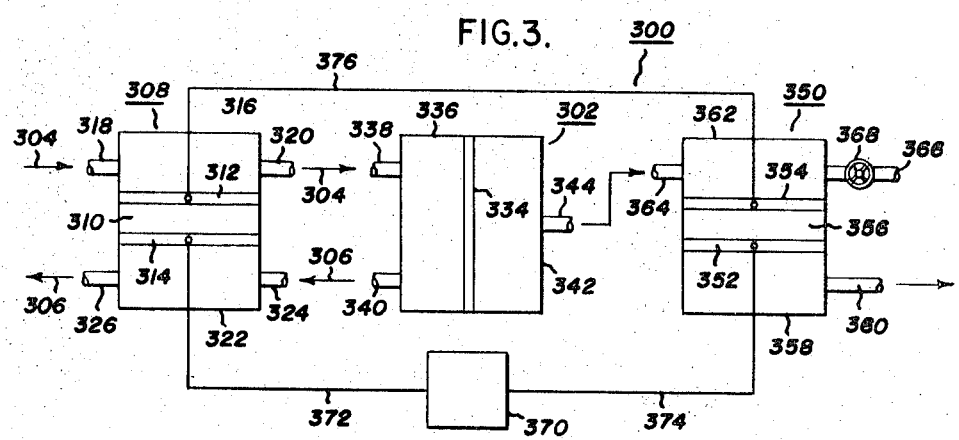
FIG. 3 is a partially schematic diagram of a modification of the system shown in FIG. 2.
Figure 4:
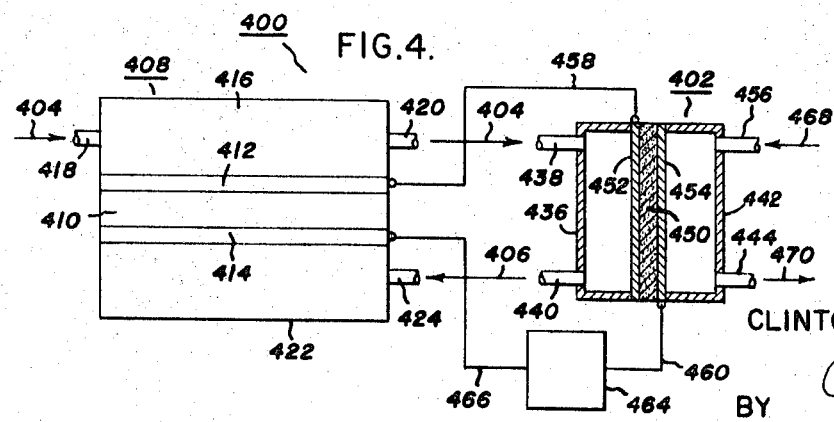
FIG. 4 is a partially schematic diagram, with the second cell unit in section, of another modified system.

The system 100 is described above with reference to certain preferred embodiments in which the receiving means 102 may be a heating means, a cooling means, or a chemical reaction site which may or may not heat or cool additionally. It is appreciated that the receiving means may take any one of a wide variety of forms. For use with my invention it is merely necessary that the receiving means receive the upstream segment of the fluid stream and deliver back at least a portion of the fluid stream to form a downstream fluid segment. FIGS. 2–4, inclusive, further illustrate the possible diversity of the receiving means.

Referring to FIG. 2, a system 200 is illustrated comprised of a fuel cell unit 208 comprised of electrodes 212 and 214, an electrolyte means 210, housing portions 216 and 222, and inlet and outlet conduits 218, 220, 224, and 226. The fuel cell unit 208 may be identical to the fuel cell unit 108. As illustrated the fuel cell unit 208 differs by the inclusion of a valve 232 controlling the outlet conduit of the housing portion 222. Electrical leads 230 connect the electrodes through an electronically conductive means 228, which in this instance is a D-C potential source.

The receiving means 202 is provided with a barrier 234. Peripherally sealed against the barrier adjacent one side thereof is a first housing portion 236 having an inlet conduit means 238 for receiving the upstream segment 204 of a fluid stream and an outlet conduit means 240 for delivering the downstream segment 206 of the fluid stream. Peripherally sealed against the opposite surface of the barrier is a second housing portion 242 provided with an outlet conduit means 244.

The barrier 234 may be any conventional barrier that permits the selective physical separation of one fluid from another. De Rosset in Pat. No. 2,824,620 and Stern in Pat. No. 3,332,216 provide teachings of exemplary useful barriers. If it is assumed, for purposes of illustration only, that the upstream segment 204 of the fluid stream is impure hydrogen, such as, for example, hydrogen containing nitrogen or carbon dioxide, the barrier is formed of a metal foil which is selectively permeable to hydrogen, such as palladium, nickel, or palladium-silver alloy foil, and a higher fluid pressure exists in housing portion 236 than housing portion 242 a pure stream of hydrogen may be obtained from the second housing portion outlet 244. The fluid stream segment 206 leaving the receiving means 202 may still contain undesirably large quantities of hydrogen. By connecting the D-C potential source 228 across the electrodes 212 and 214 of the fuel cell unit 208, the housing portions 216 and 222 of which form a portion of the means transporting the fluid stream to and from the receiving means, hydrogen may be displaced from the downstream segment of the fluid stream back to the upstream segment. Thus, the loss of hydrogen as the fluid stream portion leaves the system through the outlet conduit 226 may be minimized or eliminated.

FIG. 2, like the remaining figures of this patent application, is in diagrammatic form. In most applications the fuel cell unit is small as compared to the receiving means. In other variations the receiving means 202 may be provided with a plurality of barriers in series and/or parallel relationship, rather than a single barrier as schematically illustrated. Where the proportion of impurity in the electrochemically consumable and regenerable fluid to be physically separated at the barrier is initially low in the fluid stream entering the system, the valve 232 may be initially closed. The relatively small volume of fluid impurities will then collect in the housing portion 222 and may be periodically purged from the system by manually or otherwise opening and closing the valve. It is also anticipated that the housing portion 222 may be formed to define a large volume so that it is adequate to store all impurities that may accumulate. While the above description describes the selective physical separation of hydrogen, it is appreciated that my system could be as well applied to the selective separation of other consumable and regenerable fluids, such as halogens and oxygen, for example. Similarly, a variety of fluid impurities in quantities ranging from major amounts to traces may be present in the electrochemically consumable and regenerable fluids.

It is anticipated that the D-C potential across the electrodes of the fuel cell unit alternately may be connected so that the electrochemically consumable and regenerable fluid species present in the incoming fluid stream is not recirculated to the barrier but is diverted away from the barrier. To provide a specific example, if it is assumed that the fluid stream entering the system is comprised of a mixture of hydrogen and helium, the barrier could in this instance be a linear fluorocarbon barrier as taught by Stern so as to be selectively permeable to helium. In a well designed system either the fuel cell unit 208 or the barrier 234 is capable of entirely separating the hydrogen and helium without any assistance from the other under ordinary circumstances. By using my system in which both the fuel cell unit and the barrier are available to separate the helium and hydrogen, separation is more reliably accomplished and the system is capable of operating efficiently even if the barrier of the fuel cell unit should fail in operation, as for example, by either the barrier or electrolyte element developing a crack or pin hole. Naturally, to prevent back diffusion from the fuel cell unit to the barrier in this application a check valve would preferably be provided between the receiving means outlet 240 and the fuel cell inlet 224. Again a pressure differential across the barrier 234 is relied upon to provide the driving force for helium penetration of the barrier.

FIG. 3 illustrates a system 300, which is a variant of system 200. Like elements in the systems 200 and 300 are assigned corresponding reference numerals differing in value by 100. The principal variation of the system 300 is the inclusion of a second fuel cell unit 350 comprised of electrodes 352 and 354 having electrolyte means 356 therebetween. The second fuel cell unit is provided with a housing portion mounted adjacent the electrode 352 having an outlet 360. As second housing portion 362 is mounted adjacent the electrode 354 having an inlet 364 and an outlet 366. A valve 368 controls the outlet. A D-C potential source 370 is connected to the electrodes 314 and 352 by electrical leads 372 and 374, respectively. The electrodes 312 and 354 are electrically connected by an electrical lead 376.

In a specific application a fluid stream initially containing a consumable and regenerable fluid and an electrochemically unreactive fluid, such as a mixture of hydrogen and nitrogen, may be supplied to the receiving means 302 where the hydrogen is selectively physically separated by passage through the barrier 334. Any hydrogen remaining in the fluid stream leaving the receiving means may be separated by being electrochemically consumed at the electrode 314 and regenerated at the electrode 312. Thus, the fuel cell unit acts to improve the efficiency of hydrogen separation through the barrier by scrubbing hydrogen from the fluid stream as it leaves the system and transporting the hydrogen so that it is recirculated to the barrier. To this extent the operation of the system 300 may be identical to that of system 200. Also, like system 200, a higher pressure of hydrogen in housing portion 336 than in housing portion 342 provides the driving force.

The improvement of the system 300 lies in the fact that provision is made for the possibility that the barrier 334 may not be completely effective in separating hydrogen and nitrogen. For example, the barrier may be formed of a material that is not totally selective to hydrogen permeation, or the barrier may develop a fault in use allowing physical passage of nitrogen therethrough. The second fuel cell unit 350 acts to insure purified hydrogen is supplied from the system through outlet 360, since the second fuel cell unit is also capable of selectively separating hydrogen under ordinary operating conditions. The valve 368 is provided to allow periodic purging of the second housing portion 362 should nitrogen accumulate therein.

The system 400 shown in FIG. 4 differs principally from the preceding systems 100 and 200 in that the receiving means 402 is itself a fuel cell unit. For simplicity the fuel cell unit 402 is diagrammatically illustrated in FIG. 4 as a single fuel cell comprised of an electrolyte element 450 having first and second electrodes 452 and 454 adjacent opposite sides thereof. A first housing portion 436 is peripherally sealed against the first electrode and is provided with an inlet conduit 438 and an outlet conduit 440. A second housing portion 442 is peripherally sealed against the second electrode and is provided with an inlet conduit 456 and an outlet conduit 444. The fuel cell unit 408 is identical to fuel cell unit 208, except that the outlet conduit 226 is optionally omitted. Corresponding elements in the systems 200 and 400 are assigned reference numerals differing in value by 200.

The electrical interconnection of the fuel cell units 408 and 402 is indicated schematically by the electrical lead 458 which connects the electrodes 412 and 452 of the fuel cell units. Electrical lead 460 connects the electrode 454 to an electrical load 462, and electrical lead 464 connects the electrical load to the electrode 414 to complete the circuit.

The fuel cell unit 402 in addition to being supplied with the one fluid stream represented by flow arrows 404 and 406 is supplied with a second fluid stream represented by flow arrows 468 and 470.

In a preferred application the system 400 is used to generate and supply to electrical load 462 electrical power. The fuel cell unit 402 may be utilized to generate electrical power by supplying to the electrode 454 an oxidant, such as oxygen or air, as indicated by flow arrows 468 and 470. In one form the housing portion 442 may be omitted and ambient air utilized as an oxidant. In an exemplary form the electrode 452 of the fuel cell unit 402 may be supplied with hydrogen containing minor amounts of a relatively electrochemically inert impurities, such as nitrogen, carbon dioxide, etc. The fluid stream segment being transported to the electrode 452 is represented by flow arrow 404 while the portion of the fluid stream not consumed at the electrode 452 is designated by flow arrow 406.

The fuel cell unit 408 performs the useful function of scrubbing residual hydrogen from the fluid stream segment 306 leaving the electrode 452. It is noted that the fluid stream as it is transported to the electrode 452 comes into fluid communication with the electrode 412. The fluid stream that leaves the fuel cell unit 402 is collected in the housing portion 422 of the fuel cell unit 408. Fluid may be continuously bled from the housing portion 422 by provision of an outlet conduit, not shown, or periodically bled by the additional inclusion of a valve, such as valve 232, shown in FIG. 2. In the form of the unit shown inerts may be simply accumulated in the housing portion and no provision for bleed provided. This arrangement may be utilized where the volume defined by the housing portion 422 is relatively large and/or a low proportion of non-reactive species are provided in the fluid stream. A fuel cell unit readily adapted for use in this manner is disclosed by Titterington et al. in patent application Ser. No. 548,788, filed May 9, 1966, included by reference.

If it is assumed that the fuel cell unit 402 is a hydrogen-oxygen fuel cell, the potential difference between electrodes 452 and 454 will range from 1.0 to 0.5 volt, approximately, depending on the current being supplied to the electrical load 464. Since hydrogen is present in communication with both electrodes 412 and 414, a very small potential difference will be observed between these electrodes, in the order of 0.1 volt. It is then apparent that the fuel cell unit 402 may actually displace hydrogen across the electrodes of the fuel cell unit 408 and still produce added amounts of electrical power that may be usefully consumed by the electrical load 462.

While the system 400 has been described with reference to the preferred application of scrubbing hydrogen, it is appreciated that the system may as well be used to scrub oxidant from an impure oxidant stream leaving the electrode 452. In such application, of course, the flow arrows 468 and 470 indicate the path of fuel flow, this being reversed from the preferred application.

As a variation of the system 400, FIG. 5 illustrates a system 500 in which both the oxidant and fuel streams are being scrubbed and the unconsumed portion of the fuel and oxidant is returned to the incoming reactant stream. The fuel cell unit 502 generates electrical power to be supplied to the electrical load 504. A fuel cell unit 502 is provided with a fuel electrode 506 and an oxidant electrode 508 lying on opposite sides of an electrolyte means 510. Both the fuel and oxidant are in this instance selected from fluids that are electrochemically consumable and regenerable. For example, the fuel stream represented by flow arrows 512 may be impure hydrogen while the oxidant stream represented by flow arrows 514 may be impure oxygen. The fuel cell unit 502 is provided with fuel and oxidant inlet conduits 516 and 518, respectively, and fuel and oxidant outlet conduits 520 and 522, respectively.

Fuel cell units 524 and 526 which form part of the fluid transporting portions of the system scrub hydrogen and oxygen, respectively, from the exhaust streams leaving the fuel cell unit 502. The fuel cell units 524 and 526 may be identical in structure and function to the fuel cell units 108, 208, or 408 described above. It is noted that the electrical load is connected electrically to the electrode 506 of the fuel cell unit 502 through the electrical lead 528, electrode 530 at which purged hydrogen is consumed, the electrolyte means 532 providing an ionically conductive path, the electrode 534 for delivering regenerated hydrogen to the fluid stream, and finally the electrical lead 536. In like manner the electrical load is connected to the oxidant electrode 508 through an electrical lead 538, the electrode 540 for consuming purged oxygen, the electrolyte means 542, the electrode 544 for delivering regenerated oxygen to the oxidant stream, and finally electrical lead 546.

In this particular application the parasitic power losses attributable to both the fuel cell units 524 and 526 may leave only a fraction of the power output of the fuel cell unit 502 available to the electrical load where the unit 502 is only a single fuel cell. It is accordingly preferred to utilize a fuel battery as the unit 502 in this system.

To allow the salient characteristics of the systems of FIGS. 1 through 5 inclusive and the related processes to be succinctly outlined, these systems and processes have been described with reference to the use of certain exemplary electrochemically consumable and regenerable fluids and certain exemplary fluid mixtures, although it is recognized that a spectrum of fluids and fluid combinations may be usefully utilized in the practice of my invention. Similarly, the fuel cell units and receiving means may vary widely from the diagrammatic forms illustrated. Inasmuch as cell units, receiving means, and electrochemically consumable and regenerable fluids and their characteristics are per se well known in the art, the selection for use of specific fluids and structures would, in view of my teaching, be a matter of routine.

For example, when iodine gas is pumped by the fuel cell unit 108 across a thermal gradient, the fuel cell unit may be constructed according to the teaching of Weininger in Pat. No. 2,890,259; the structural modifications of eliminating the hollow insulating member and its function as well as providing inlets and outlets for the housing members for use of the Weininger fuel cell unit in this application in view of my teaching are considered to be of an obvious character. Halogen gases having analogous electrochemical properties, my invention could be applied readily also to the pumping of the other common halogen gases, chlorine and bromine.

Where the fluid to be consumed at one electrode and regenerated at the counter electrode is hydrogen or oxygen, a specific cell structure and specific examples of the mechanisms for consumption and regeneration are provided by Maget in patent application Ser. No. 385,925, filed July 29, 1964, now Pat. No. 3,489,670, the disclosure of which is here incorporated by reference. As is apparent by reference to the teachings of Maget, the displacement of the electrochemically consumable and regenerable fluid may be either a physical pumping of the fluid in ionized form through the electrolyte or a net displacement in which the fluid atoms that are consumed are not necessarily the same fluid atoms that are regenerated. Both mechanisms are viewed as displacing fluid inasmuch as for any given quantity of fluid electrochemically consumed at one electrode an identical quantity of that fluid appears at the counter electrode.

To illustrate the direct pumping mode of operation, if it is assumed that a fuel cell unit is provided with an acid or cation exchange electrolyte, the displacement of hydrogen is accomplished through the following electrode reactions:

At the anode

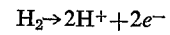
$$H_2 \rightarrow 2H^+ + 2e^-$$

At the cathode

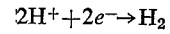
$$2H^+ + 2e^- \rightarrow H_2$$

If, however, it is desired to displace oxygen and an alkaline or anion exchange electrolyte is employed, the displacement of oxygen proceeds through the following electrode reactions:

At the cathode

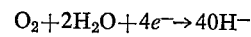
$$O_2 + 2H_2O + 4e^- \rightarrow 4OH^-$$

At the anode

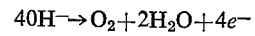
$$4OH^- \rightarrow O_2 + 2H_2O + 4e^-$$

To illustrate displacement where the atoms are not physically transported through the electrolyte, the displacement of hydrogen may be accomplished across an alkaline or anion exchange electrolyte as indicated by the following electrode reactions.

At the anode

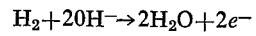
$$H_2 + 2OH^- \rightarrow 2H_2O + 2e^-$$

At the cathode

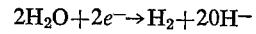
$$2H_2O + 2e^- \rightarrow H_2 + 2OH^-$$

Similarly, the displacement of oxygen across an acid or cation exchange electrolyte is illustrated by the following electrode reactions:

At the cathode

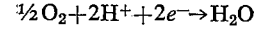
$$\tfrac{1}{2}O_2 + 2H^+ + 2e^- \rightarrow H_2O$$

At the anode

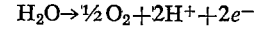
$$H_2O \rightarrow \tfrac{1}{2}O_2 + 2H^+ + 2e^-$$

It is noted that the electrode reactions differ in the circumstance where the displaced fluid is not pumped through the electrolyte in ionized form in that the fluid to be electrochemically consumed and regenerated interacts with water at each of the electrodes. Maget teaches various techniques for maintaining the requisite moisture balance at the electrodes. In my applications moisture may be simply entrained in the fluid stream, if desired. While Maget's teachings are directed to the improvements associated with the use of ion exchange materials, it is by now well recognized in the art that fuel cell units containing conventional acid or alkaline electrolyte may be usefully employed, with aqueous electrolytes being most preferred for applications where the electrochemically consumable and regenerable fluid is not being physically transported through the electrolyte in ionized form. Where the receiving means may be a heating or cooling means and a large thermal gradient across the electrodes is contemplated, it is preferable to utilize an inorganic ion exchange material as an electrolyte, such as zirconium phosphate, a teaching of which appears in Grasselli et al. Pat. No. 3,276,910.

FIGS. 6 through 9 inclusive are directed to a group of systems which are improvements over the system 400 principally by the provision of means for periodically and automatically purging the downstream housing portion of the fuel cell unit employed to recirculate an electrochemically consumable fluid to an electrode of a fuel cell unit utilized to generate electrical power. In a preferred application these systems are utilized with an electrochemically consumable and regenerable fuel, such as hydrogen, which contains minor amounts of electrochemically relative inert species. The fuel cell unit which regenerates the fuel serves to improve the fuel consumption efficiency of the system by recirculating the fuel to the power generating fuel cell unit. When a predetermined electrical potential develops between the consuming and regenerating electrodes of the recirculating fuel cell unit, the exhaust conduit leading from the downstream housing portion is opened and the relatively inert species which have accumulated in this housing portion are purged from the system.

Each of the purge systems of FIGS. 6 through 10 inclusive possess distinct advantages over the purge systems for power generating fuel cell units heretofore known to the art. In order to avoid possibility of hydrogen leakage from the fuel cell unit in use, it is generally preferred that the fuel cell unit be operated with a below atmospheric pressure fuel supply. In order to purge, however, it has been necessary to switch to fuel pressures above atmospheric. In the use of my system it is not necessary that the power generating fuel cell unit be supplied with above atmospheric fuel pressures either in operation or during purging, although these may be used at any time, if desired. Another disadvantage of conventional systems is that it is necessary to provide a relatively large fluid reactant storage space in the fuel cell units adjacent the electrodes at which the fluid reactant is consumed. This attributable to the fact that relatively inert fluids entrained in the fuel are usually stored in the fuel cell units prior to purging. Thus, to allow any appreciable accumulation without polarization of the adjacent electrode or electrodes an appreciable reactant volume must be present to dilute the relatively inert fluid. It is recognized that my systems are not the first to provide for the automatic purge of power generating fuel cell units. Such systems are disclosed, for example, by Winsel in Patent No. 3,317,348 and by Justi et al. in Patent No. 3,256,116. These systems require, however, the polarization of at least the last cell of a power generating fuel cell unit in order to actuate purging. It is an advantage of my systems that it is not necessary that the power generating fuel cell units ever be polarized in order to initiate purging, although this may be used as a criteria for terminating purge in at least one embodiment. In the following detailed descriptions elements which correspond to those of system 400 are assigned like reference characters and, for the sake of brevity, are not redescribed in detail.

FIG. 6 illustrates a system 600, which differs from the system 400 by providing an outlet conduit 602 controlled by a valve element 604 actuatable between open and closed positions by a solenoid 606. The valve element is normally biased to the closed position, absent an electrical current through the winding of the solenoid. The solenoid winding is connected in parallel with the fuel cell unit 408 as indicated by electrical lead 608 and 610.

In operation of the system 600, impure hydrogen, for example, may be fed through the housing portion 416 of the fuel cell unit 408 to the housing portion 436 of the fuel cell unit 402. Most of the hydrogen will be consumed in the housing portion 436. The fluid stream entering the housing portion 422 downstream of the fuel cell unit 402 will in most instances contain an increased proportion of relatively non-reactive impurities and a lesser proportion of hydrogen. The residual hydrogen is displaced between the electrodes 414 and 412 by the driving force of the fuel cell unit 402 as described in connection with system 400.

Initially the potential of the electrodes 412 and 414 are very nearly equal, the potential difference thereacross being merely a measure of the irreversibility of the electrodes. As impurities collect adjacent the electrode 414 this electrode gradually polarizes and a substantial potential difference develops between electrodes 412 and 414. As this occurs a larger proportion of the current passing through the electrical load 462 is shunted through the initially relatively high resistance path represented by the electrical leads 608 and 610 and the solenoid winding 606. At a predetermined current level, which may be correlated with a predetermined potential across the electrodes 412 and 414, the solenoid opens the valve 604 and purges the housing portion 422 of inerts. Where the fuel is initially supplied above atmospheric pressure, the inerts may be bled to the atmosphere. Where the fuel supply is below ambient pressure, the outlet conduit is, of course, connected to a fluid reservoir also below ambient pressure. When the proportion of inerts in the housing portion 422 is decreased so that the electrode 414 is depolarized, the current flow through the solenoid decreases sufficiently to allow the valve to return to its normally closed condition.

FIG. 7 illustrates a system 700 which differs from system 600 in providing for purging for a fixed time interval. As in system 600 the outlet conduit 702 for the housing portion 422 is controlled by a valve element 704 that is normally biased to close the conduit. The valve element is controlled by a solenoid 706. The electrodes 414 and 454 are identically electrically connected as in systems 400 and 600, but the electrodes 412 and 452 are connected by electrical lead 458 through a resistance 708. A parallel electrically conductive path between the electrodes 412 and 452 is through electrical lead 710 connected between electrical lead 458 and a fixed contact 712, which for ease of illustration is shown carried by the outlet conduit 702. An electrical contact 714 which is movable with the valve element 704 and shown depending therefrom is electrically connected to the electrode 452 through electrical lead 716. Electrical lead 718 connects on terminal of the solenoid winding to the electrical load 462 similarly as in system 600. Electrical lead 720 attached to the remaining terminal of the solenoid winding is connected to a fixed contact 722. A movable contact 724 is carried by a bi-metallic strip 726. The contact 724 is connected to the electrode 452 to provide a third parallel current path.

In operation of the system 700, the fuel cell unit normally generates electrical power, which services the electrical load 462 and drives the fuel cell unit 408 to displace hydrogen, or any other desired electrochemically consumable and regenerable fluid, across the electrodes 412 and 414. In view of the resistance 708, the current flowing between the electrodes 412 and 452 initially flows through electrical lead 716, contacts 712 and 714 and electrical lead 710. Since the electrodes 412 and 414 are initially at very nearly the same potential level, only a small current passes through the solenoid 706, insufficient to actuate the solenoid. When the accumulation of inert fluids polarizes the electrode 414 to a predetermined potential level, sufficient current is shunted through the solenoid winding to allow actuation of the valve element 704. This in turn opens electrical contacts 712 and 714, which are normally closed. A substantial portion of the electrical current between the fuel cell units is in this circumstance passed through the resistance 708. The heat generated in time causes the bi-metallic strip to deform sufficient to open the electrical contacts 722 and 724. With these contacts open no current can flow through the solenoid winding, and the valve element 704 again closes to shut off conduit 702 and to remake contacts 712 and 714. When the bi-metallic strip cools sufficiently to remake contacts 722 and 724, the system is returned to its original condition. The advantage of this system is that purging is insured for the time interval required to heat the bi-metallic strip. This can be controlled by the proximity of the strip to the resistance, the value of the ressitance, and the choice of strip construction, so that a substantial variation of time intervals may be chosen from to effect purging.

FIG. 8 illustrates a system 800, which is a preferred system. A fuel battery 802 is provided comprised of an electrolyte element 804, which in this instance is preferable an ion exchange membrane or a porous matrix having an electrolyte immobilized therein. A plurality of electrodes 806a, 806b, 806c, 806d, and 806e are shown mounted adjacent one major surface of the electrolyte element. A plurality of electrodes 808a, 808b, 808c, 808d, and 808e are mounted adjacent the opposite major surface of the electrolyte element, with like lettered electrodes on opposite surfaces being mounted in directly opposed relation. A first housing portion 810 is peripherally sealingly positioned adjacent the one major surface of the electrolyte element. This housing portion is provided with an inlet conduit 812 and an outlet conduit 814 where fluid reactant may enter and leave the fuel battery as indicated by flow arrows 816 and 818, respectively. The second housing portion 820 is similarly related to the electrolyte element and is provided with an inlet 822 and an outlet 824. The fuel battery 802 is only schematically illustrated, since such fuel batteries are not per se the subject of my invention. If desired, the fuel battery may be constructed as described by Holmes in patent application Ser. No. 563,501, filed July 7, 1966, now abandoned, the disclosure of which is here incorporated by reference. While the system is preferably utilized in combination with a power generating fuel battery, it may also be applied to a power generating fuel cell.

As part of the means transporting a second fluid reactant to and from the second housing portion of the fuel battery, a fuel cell unit 826 is provided comprised of an electrolyte means 828, electrodes 830 and 832, and cooperating housing portions 834 and 836. The housing portion 834, which cooperates with the electrode 830, is provided with an inlet conduit 838 and an outlet conduit 840. The housing portion 836 cooperating with the remaining electrode of the unit is provided with an inlet conduit 842 controlled by a check valve 844 and an outlet conduit 846 controlled by a check valve 848.

A pump 850 is shown in section in a schematic form. The pump housing 852 forms a cylinder 854 into which a piston 856 is slidably and sealingly fitted. The piston is controlled by a piston rod 858. An inlet conduit 860 allows fluid flow into the pump cylinder. An aperture 862 is provided in the housing to form the outlet from the pump cylinder. The aperture is controlled by a check valve comprised of a valve housing portion 864 shown integrally formed with the pump housing. A valve element 866 controls fluid passage through the aperture by cooperating with a seat 868. A compression spring 870 biases the valve element toward the seat. A conduit means 872 is provided to conduct fluid from the system.

The second fluid reactant, which is comprised of an electro-chemically consumable and regenerable fluid, is delivered to the second housing portion of the fuel battery through the housing portion 834 of the fuel cell unit as indicated by flow arrows 874. The fluid stream leaving the fuel battery is exhausted from the system through the housing portion 836 of the fuel cell unit and through the pump as indicated by fluid flow arrows 876.

The system supplies useful quantities of electricity to an electrical load 878. Although sharing a common electrolyte element, the spaced pairs of opposed electrodes are at least the electrical equivalent of separate cells. Accordingly, the electrodes when connected electrically in series by electrical leads 880a, b, c, and d produce an electrical potential between electrodes 806a and 808e equivalent to that produced by five separate fuel cells.

The electrical load is connected to the electrode 806a through an electrical lead 882. The electrical load is normally connected to the electrode 832 of the fuel cell unit through a normally closed contact 884 of a relay 886. An electrical lead 888 is shown connected between the electrical load and the relay contact 884, and an electrical lead 890 is schematically illustrated connecting contact 884 and electrode 832. To complete the circuit between the fuel battery and the electrical load, the electrode 808e of the fuel battery is connected to the electrode 830 of the fuel cell unit by electrical lead 892, normally closed contact 894 of the relay, and electrical lead 896.

To provide for periodic reversal of the polarity of interconnection between the fuel battery and fuel cell unit, the relay is provided with a coil 898 connected electrically to the electrode 806a by electrical lead 899. The coil is connected to the electrode 808e of the fuel battery by electrical lead 897 connected to the collector 893 of transistor 895. The emitter 891 of the transistor is connected by lead 889 to normally closed contact 894 of the relay. The electrical lead 889 also connects the emitter to the electrical load through the normally open contact 887 of the relay also connected to the electrical lead 888. The base 885 of the transistor is connected to electrical lead 889 through resistance 883. The base is connected through a resistance 881 to normally closed relay contact 884, which is in turn connected through the load to electrode 806a. The base is also connected through resistance 881 to normally open relay contact 879 which is in turn connected to electrode 808e.

To maintain the polarity of interconnection between the fuel battery and fuel cell unit reversed until polarization of electrode 808e occurs, a transistor 877 is provided with a collector 875 connected through a normally open relay contact 873 to the relay coil. The emitter 871 is connected by electrical lead 869 to the electrode 808e of the fuel battery. The base 867 of the transistor is connected through resistance 865 to the electrode 808e and through resistance 863 to electrode 806e.

To place the system 800 in operation, the first fluid reactant is supplied to the inlet conduit 812 of the first housing portion 810. In the exemplary situation in which the first reactant is ambient air, the first housing portion may be filled with reactant merely by leaving conduits 812 and 814 in open ended contact with the atmosphere. Assuming that the second fluid reactant is a reactant other than air, it is usually desirable to purge the system on start up to draw the second fluid reactant through the system and to remove air that may have diffused into the second housing portion 820 as well as the housing portions 834 and 836 of the fuel cell unit. To accomplish this, the pump 50 is actuated by reciprocating the piston rod 858 and the piston 856 in the cylinder 854.

This causes the second fluid reactant to be drawn through the housing portion 834 and into the fluid conduit 822 as indicated by fluid flow arrows 874. The second fluid reactant is drawn through the second housing portion, the outlet conduit 824, the check valve 844, the housing portion 836, and the check valve 848. This flow path is indicated by flow arrows 876. As the piston is reciprocated in the pump cylinder, fluid is alternately drawn into the cylinder and subjected to the compressive action of the piston. The check valve 848 allows fluid to be drawn from the housing portion 836, but prevents return of fluid on the compressive stroke of the piston. At the same time, the check valve element 866 prevents drawing fluid through the conduit 872 into the system, but allows compressed fluid to leave the system through conduit 872. The piston rod may be actuated by any conventional means and is preferably manually actuated.

The fuel battery supplies electrical power to the load 878 through electrical lead 882 connected to electrode 806a and electrical lead 888 connected through normally closed relay contact 884, fuel cell unit 826, electrical lead 896, normally closed contact 894, and electrical lead 892 to the electrode 808e. Thus, it is apparent that the fuel cell unit is connected electrically in series with the load. The fluid stream comprised of the second reactant, indicated by flow arrows 874, is noted to pass into contact with the electrode 830 of the fuel cell unit upstream of the inlet conduit 822 of the fuel battery. At the same time the fluid stream 876 leaving the fuel battery comes into contact with the electrode 832 of the fuel cell unit. The electrochemically consumable and regenerable constituent of the fluid stream leaving the fuel battery that is not consumed by the fuel battery is consumed at the electrode 832 and regenerated at the electrode 830. The regenerated fluid is entrained in the fluid stream supplied to the fuel battery so that it again has the opportunity to be consumed at the electrodes 808. This allows for highly efficient utilization of the electrochemically consumable fluid.

If during operation relatively non-consumable fluid stream constituents accumulate in the second housing portion 836 of the fuel cell unit, an electrical potential of increased value will develop between the electrodes 830 and 832 due to the polarization of electrode 832. This will in turn increase the potential difference across the resistances 881 and 883 connected between the electrodes. When a potential difference of predetermined value develops across the resistance 883 a current will be created between the base 885 and emitter 891 of the transistor 895 allowing a current to be conducted between the emitter and the collector 893. This in turn draws a current through the coil 898 of the relay sufficient to open the normally closed contacts 884 and 894 and close the normally open contacts 879, 887, and 873. The principal effect of this is to reverse the polarity of interconnection of the fuel cell unit and the fuel battery. Now, instead of displacing the electrochemically reducible fluid from the electrode 832 to the electrode 830, this fluid is displaced from the fluid stream 874 upstream of the fuel battery into the second housing portion of the fuel cell unit. The check valve 844 prevents this fluid from flowing to the fuel battery. The displaced fluid is bled from the system through outlet conduit 846, check valve 848, and pump 850. The inerts that have accumulated in the second housing portion of the fuel cell unit are purged from the system along with the displaced fluid.

To sustain purging for the desired duration, the transistor 877 is provided. Closing the contact 873 allows current to initially flow through the collector 875 and emitter 871 of the transistor so that current flows between the electrodes of the fuel battery through the coil 898, contact 873, and transistor 877. The transistor is maintained conductive by connecting the emitter through resistances 863 and 865 to the electrode 806e of the fuel battery. So long as a predetermined potential difference is maintained between electrodes 806e and 808e a potential difference exists across the resistance 865, and the base 867 of the transistor is maintained at a conductive potential as compared to the emitter. With the second fluid reactant being diverted from the fuel battery and also being consumed in the housing portion 820 of the fuel battery, in a short period of time the electrode 808e will become reactant starved thereby polarizing. The decrease in potential difference between the electrodes 808e and 806e renders the transistor 877 non-conductive. This terminates electrical current flow through the relay coil and allows the contacts to revert to their original disposition. The system, then, automatically purges itself and returns to the initial condition without interruption of service.

A number of variations in the system 800 may be introduced without departing from the inventive concept. It is immaterial whether the fuel cell unit 826 is a fuel cell or fuel battery, although in most applications a fuel cell will suffice. The fuel cell unit 826 and fuel battery 802 may take any one of a variety of forms known to those skilled in the art. Instead of sensing polarization of the electrode 808e solely, the electrical lead 888 may be connected to electrodes 806d, c, b, or a with electrodes 808d, c, b, and a in such case participating in generating the polarization signal which renders the transistor 877 non-conductive. Instead of using transistors in the system, silicon controlled rectifiers may be substituted. Where the first reactant is ambient air, the first housing portion 810 may be entirely omitted. Where the oxidant fed to the fuel battery contains small quantities of an impurity which requires purging, the system may be applied to purging an oxidant rather than a fuel as is in most instances the preferred application. If both the oxidant and fuel contain impurities, it would require no more than obvious duplication to apply my system to purging both the fuel and oxidant streams of the system.

Figure 9:
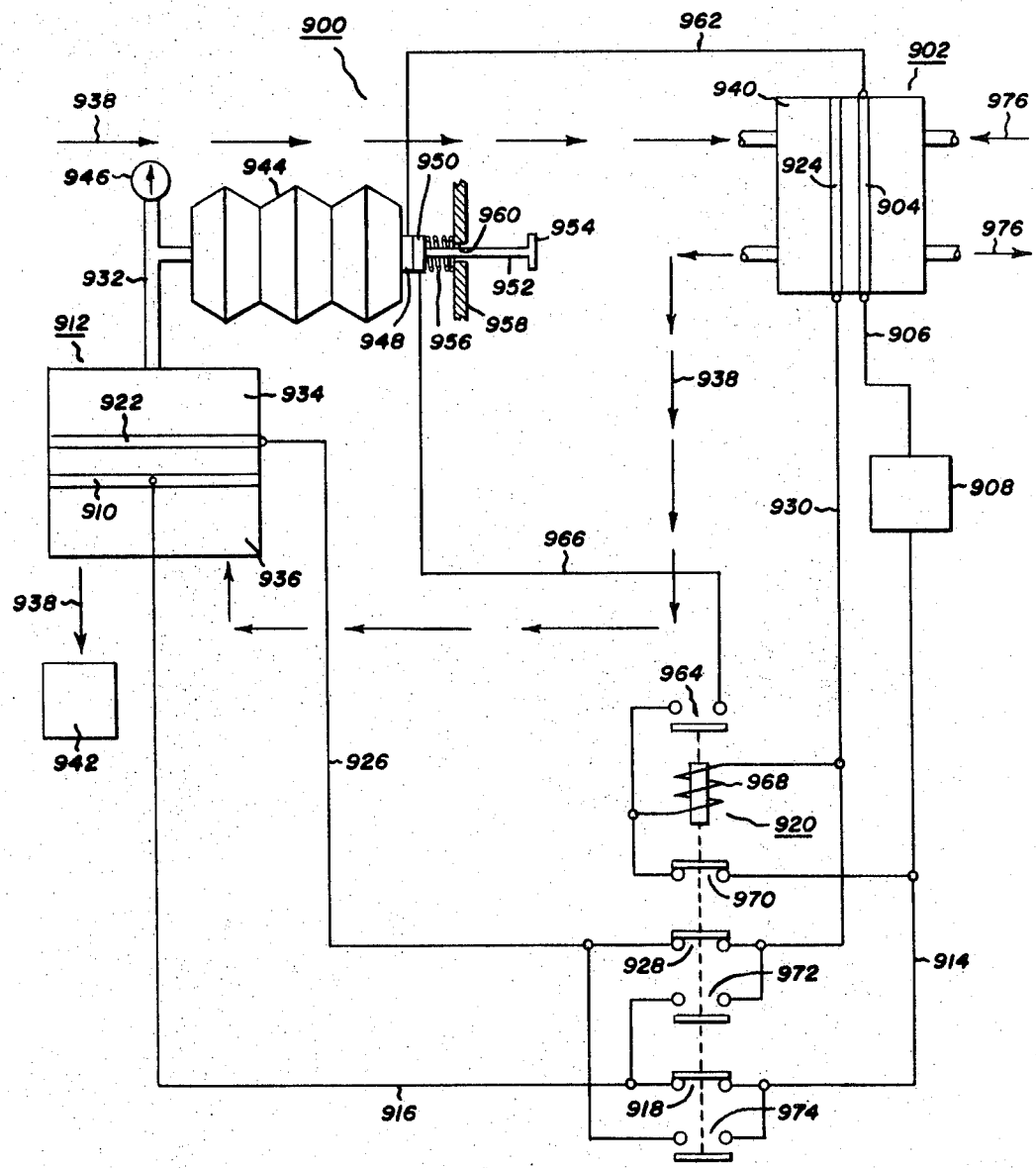
FIG. 9 is a partially schematic diagram, with a fuel battery shown in section, of an alternate system.

FIG. 9 illustrates a variant system 900 comprised of a power generating fuel cell unit 902, schematically shown. Electrode 904 of this fuel cell unit is connected by electrical lead 906 to electrical load 908. The electrical load is also connected to the electrode 910 of the fuel cell unit 912 by electrical leads 914 and 916 connected through normally closed contacts 918 of relay 920. The counter electrode 922 of fuel cell unit 912 is electrically connected to the counter electrode 924 of the fuel cell unit 902 by electrical lead 926, normally closed contacts 928 of the relay, and electrical lead 930.

The fuel cell unit 912 differs from those previously described solely by the fact that a single conduit 932 serves as both fluid inlet and outlet for the first housing portion 934 of this fuel cell unit. As in each of the previously described fuel cell units the second housing portion 936 receives a fluid stream 938 through a fluid conduit, not shown, from the second housing portion 940 of the fuel cell unit 902 and exhausts the fluid stream through a separate fluid conduit, not shown, to a pump 942. The fluid stream 938 passes through check valves, not shown, located between the fuel cell units 902 and 912 and between unit 912 and pump 942 in like manner as in the system 800. The first housing portion conduit communicates with a bellows 944 between the housing portion and a check valve 946.

The bellows carries a contact 948 while a cooperating contact 950 is carried by a plunger 952 having a stop shoulder 954 at one end, the plunger being biased by a spring 956 normally compressed between the plunger contact and a fixed mount 958 having an aperture 960 therein. The contact 948 on the bellows is shown connected to electrode 904 by an electrical lead 962. The contact 950 is connected to a normally open contact 964 of the relay by an electrical lead 966.

The relay additionally includes a coil 968 connected between the electrodes 924 and 904 through load 908 by normally closed contact 970 as well as normally open contact 964. To provide for reversal of the polarity of interconnection between the fuel cell units, a normally open electrical contact 972 is provided connected between electrodes 924 and 910 and a normally open electrical contact 974 is provided connected between electrodes 904 and 922 through load 908.

In operation, a fluid stream is initially circulated over the electrode 904 of the power generating fuel cell unit 902 as indicated by flow arrows 976. A second fluid stream containing an electrochemically consumable and regenerable fluid as well as an electrochemically relatively inert fluid is indicated by flow arrows 938 as being circulated over the electrodes 924 and 910. The fluid may be initially drawn through the system by pump 942. It is immaterial whether the bellows 944 is initially inflated or deflated, since fuel cell unit 912 will on start up act to inflate the bellows.

Initially the potential across the electrodes 910 and 922 will be small so that an insufficient potential difference exists across the coil 968 to produce an actuating current. As the relatively inert component of the fluid stream collects in the housing portion 936, however, an increase in the current through the coil will take place until the relay is actuated opening the normally closed contacts and closing the normally open contacts thereof. Upon switching, current supply to the relay coil is continued through normally open contacts 964 and through cooperating contacts 948 and 950.

After the relay has been actuated, the direction of displacement of the electrochemically consumable and regenerable fluid is reversed so that displacement from the electrode 910 to the electrode 922 is changed to displacement in the opposite direction. Since the check valve 946 prevents any fluid from entering the conduit 932 from the fluid stream upstream of the fuel cell unit 902, the fluid present in the bellows 944 is progressively depleted. When a fixed volume of fluid has been displaced, which may correspond to a predetermined number of coulombs being supplied to the fuel cell unit 912, the contacts 948 and 950 are separated. It is noted that separation of the contacts does not occur initially because of the freedom of travel of the plunger 952 through the aperture 960 in the fixed member 958. The spring 956 biases the plunger to travel with the bellows while the stop shoulder 954 limits the length of travel. The volume of fluid to be displaced before the initial condition of the system is resumed may very well be controlled by adjusting, or proper choice of, the position of the stop shoulder. When the contacts 948 and 950 separate, current through the coil 968 terminates causing the contacts to revert to their original position.

In systems 800 and 900 the use of a pump to initially purge the system has been described. It is my inventive recognition that the use of a pump for initial purging is not necessary in situations where the electrochemically consumable and regenerable fluid contained in the fluid stream is either hydrogen or oxygen and where the electrolyte contains water, as is true of acid, aqueous alkaline, and ion exchange electrolytes. In such circumstance it is my recognition that by replacing the electrical load in the system with a D-C potential source exhibiting a potential difference above the electrolysis potential of water, approximately 2.0 volts, the system may be purged by spontaneously generating hydrogen and oxygen within the housing portions of the fuel cell units. Hydrogen will be generated in one housing portion adjacent one electrode at twice the rate oxygen is generated in the housing portion adjacent the counter electrode. In the system 800, for example, if it is assumed that the fluid stream delivered to housing portions 820 and 836 is impure hydrogen, the system may be conveniently purged on start up substituting for the electrical load 878 a D-C potential source having its positive terminal connected to electrode 806a and its negative terminal connected to electrode 808e. This causes hydrogen to be generated by electrolysis in the housing portions 820 and 836 at twice the rate oxygen is generated in the housing portions 810 and 834. If such a start up technique is utilized in the system 800, a check valve would, of course, be located between the housing portions 820 and 834 to prevent mixing of hydrogen and oxygen by diffusion upon electrolysis. Once the system has been purged by electrolysis, operation would proceed in the manner previously described.

While my invention has been specifically described with reference to the use of a fuel cell or a fuel battery—i.e., a battery of fuel cells—it is appreciated that my invention may be practiced with any power generating cell or battery having at least one electrode which is capable of consuming a fluid reactant. Such cells are so well known and so directly applicable to the practice of my invention that no elaborate description of applicability to all embodiments is thought necessary or desirable. To provide an illustration, however, it may be noted by reference to FIG. 4 that the electrode 454 could, if desired, be a conventional primary or secondary electrode instead of a fluid consuming electrode. Considering the specific example in which the electrode 452 is an oxygen or air electrode, the electrode 454 could usefully be a magnesium or aluminum primary electrode or a zinc or cadmium secondary or primary electrode, as is well understood by those skilled in the art. Note should be taken, though, of the fact that the use of a conventional primary or secondary electrode is limited to the fuel cell units shown which function to generate electrical power and does not extend to the fuel cell units provided to divert the electrochemically consumable and regenerable fluid between the upstream and downstream segments of the fluid stream being circulated with respect to the receiving means.

While I have described my invention with reference to certain preferred embodiments, it is appreciated that numerous variations will readily occur to those skilled in the art. It is accordingly intended that the scope of my invention be determined by reference to the following claims.

What I claim and desire to secure by Letters Patent of the United States is:

1. A process for diverting from and returning to a fluid stream comprised of a plurality of different fluids, a selected electrochemically consumable and regenerable fluid including the steps of
   circulating at least a portion of the fluid stream including an electrochemically consumable and regenerable fluid through a receiving zone and,
   ionically displacing the selected fluids between segments of the fluid stream located upstream and downstream the receiving zone including
      passing the fluid stream past a first electrode and electrochemically consuming the selected fluid at said first electrode by converting it to ions,
      electrolytically transporting the ions of the one selected fluid at the first electrode to a second electrode in contact with the remaining fluid segment, and
      electrochemically regenerating the selected fluid at the second electrode, thereby transporting the selected fluid back to the said one fluid stream segment.

2. A process according to claim 1 additionally including the step of heating at least a portion of the fluid stream in the receiving zone.

3. A process according to claim 1 additionally including the step of cooling at least a portion of the fluid stream in the receiving zone.

4. A process according to claim 1 in which at least a portion of the fluid stream is removed in the receiving zone.

5. A process according to claim 4 in which at least a portion of the fluid stream is chemically reacted within the receiving zone.

6. A process according to claim 5 in which a portion of the fluid stream is displaced from the upstream segment to the downstream segment of the fluid stream.

7. A process according to claim 5 in which a portion of the fluid stream is displaced from the downstream segment to the upstream segment of the fluid stream.

8. A process according to claim 4 in which the selected front of the fluid stream is physically separated and removed within the receiving zone.

9. A process according to claim 4 in which a portion of the fluid stream is electrochemically consumed in the receiving zone.

10. A process according to claim 9 in which a portion of the fluid stream is displaced from the downstream segment to the upstream segment of the fluid stream.

11. A process according to claim 10 in which a portion of the fluid stream is periodically displaced from the upstream to the downstream segment of the fluid stream.

12. A process according to claim 11 in which displacement from the upstream to the downstream segment of the fluid stream is conducted for a fixed time interval.

13. A process according to claim 11 in which displacement from the upstream to the downstream segment of the fluid stream is conducted until a fixed volume of fluid is displaced.

14. A process according to claim 11 in which a cell is mounted in fluid communication with the receiving zone having an electrode capable of electrochemically consuming the selected fluid additionally including displacing from the upstream to the downstream segment of the fluid stream until a predetermined polarization of the electrode in communication with the receiving zone occurs.

15. A process according to claim 1 in which the electrodes are electrolytically communicated by a water containing electrolyte and the selected fluid is chosen from the class consisting of hydrogen and oxygen, the additional step of initially purging by connecting a D.C. potential source across the electrodes to produce electrolysis thereat.

16. A system in which there may be circulated a fluid stream comprised of a plurality of fluids at least one of which is electrochemically consumable and regenerable including
a fluid receiving means and
means for transporting at least a portion of the fluid stream to and from said fluid receiving means including
a fuel cell unit comprised of
first and second spaced electrode means capable of electrochemically consuming and regenerating the one fluid,
said first and second electrode means lying in fluid communication with the fluid stream upstream and downstream respectively of said receiving means, and
electrolyte means ionically communicating said first and second electrode means, and
means for electronically conductively connecting said first and second electrode means to promote displacement of the one fluid across said electrode means to transport only the selected electrochemically consumable and regenerable fluid between the upstream and downstream portions to remove the same from one of said portions.

17. A system according to claim 16 in which said receiving means is comprised of means permitting cooling of at least a portion of the fluid stream.

18. A system according to claim 16 in which said receiving means is comprised of means permitting heating of at least a portion of the fluid stream.

19. A system according to claim 18 in which said means permitting heating is a cell unit.

20. A system according to claim 16 in which said receiving means is comprised of means for physically removing a selected one of the plurality of the fluids in the fluid stream.

21. A system according to claim 20 in which said means for removing a portion of the fluid stream is comprised of a hydrogen permeable, non-porous metal element.

22. A system according to claim 20 in which said means for physically separating a portion of the fluid stream is comprised of a selectively permeable membrane.

23. A system according to claim 16 in which said receiving means is comprises of a second cell unit including third and fourth electrode means in spaced relation, second electrolyte means ionically communicating said third and fourth electrodes, and fluid housing means adjacent said third electrode means forming a part of said transporting means.

24. A system according to claim 23 in which said electronically conductive means interconnects said cell units in series to allow pumping of the one fluid from the fluid stream at said second electrode means to the fluid stream at said first electrode means.

25. A system according to claim 24 additionally including means to periodically reverse the polarity of interconnection between said cell units to displace the one fluid from the fluid stream at said first electrode means to the fluid stream at said second electrode means.

26. A system according to claim 25 additionally including means to maintain polarity reversal for a predetermined time interval.

27. A system according to claim 25 additionally including means to maintain polarity reversal until a predetermined volume of the one fluid is displaced from said first electrode means to said second electrode means.

28. A system according to claim 25 additionally including means to monitor the potential across said third and fourth electrode means and to terminate polarity reversal upon sensing a predetermined polarization of said third electrode means.

29. A system according to claim 23 in which said second cell unit is a fuel cell unit.

30. A system according to claim 29 in which said second cell unit is a fuel battery.

31. A system according to claim 30 in which said fuel cell battery includes a common electrolyte means for a plurality of fuel cells.

32. A system according to claim 29 in which said electronically conductive means interconnects said cell units in series to allow displacement of the one fluid from the fluid stream at said second electrode means to the fluid stream at said first electrode means and additionally including
means to periodically reverse the polarity of interconnection between said cell units to displace the one fluid from the fluid stream at said first electrode means to the fluid stream at said second electrode means,
means for sensing the potential between said third and fourth electrode means and terminating the reversed polarity interconnection.

33. A system in which there may be circulated a fluid stream comprised of a plurality of fluids at least one of which is electrochemically consumable and regenerable including a fluid receiving means including a battery comprised of
fluid confining means having an inlet and an outlet including as one element thereof first electrolyte means having one major surface in contact with the fluid stream and a second, opposed major surface out of contact with the fluid stream,
a plurality of first electrode means mounted in laterally spaced relation adjacent said first major surface of said first electrolyte means,
a plurality of second electrode means mounted in laterally spaced relation adjacent said second major surface of said first electrolyte means, and
said confining means including means to direct the fluid stream sequentially across said laterally spaced first electrode means,
means for transporting at least a portion of the fluid stream to and from said fluid receiving means including a fuel cell unit comprised of
third and fourth electrode means lying in fluid communication with the fluid stream upstream and downstream, respectively, of said receiving means, second electrolyte means ionically communicating said third and fourth electrode means, check valve means permitting unidirectional fluid flow between said first electrode means and said fourth electrode means, and pump means for initially drawing the fluid stream through said battery and said fuel cell unit, means for electrically interconnecting said electrode means in series to displace at least a portion of the one fluid from said fourth electrode means to said third electrode means, means for monitoring the potential difference between said third and fourth electrode means and selectively reversing the polarity of the electrical interconnection between said battery and said fuel cell unit upon sensing a predetermined potential difference, and means for detecting polarization of said first electrode means adjacent the outlet and terminating the reversal of interconnection polarity.

References Cited

UNITED STATES PATENTS

| | | | |
|---|---|---|---|
| 409,365 | 8/1889 | Mond et al. | 136—86 |
| 2,901,522 | 8/1959 | Bopp | 136—86X |
| 3,266,938 | 8/1966 | Parker et al. | 136—86 |
| 3,294,585 | 12/1966 | Senderoff | 136—86 |
| 3,311,507 | 3/1967 | Dittmann et al. | 136—86X |
| 3,378,405 | 4/1968 | Schumacher et al. | 136—86 |
| 3,379,572 | 4/1968 | Gay | 136—86 |
| 3,438,814 | 4/1969 | White. | |

FOREIGN PATENTS

| | | | |
|---|---|---|---|
| 1,452,564 | 10/1966 | France | 136—86 |

ALLEN B. CURTIS, Primary Examiner